Sept. 2, 1958   B. M. SILVERBERG ET AL   2,850,074
SEAT ADJUSTING MECHANISM
Filed July 25, 1955   2 Sheets-Sheet 1
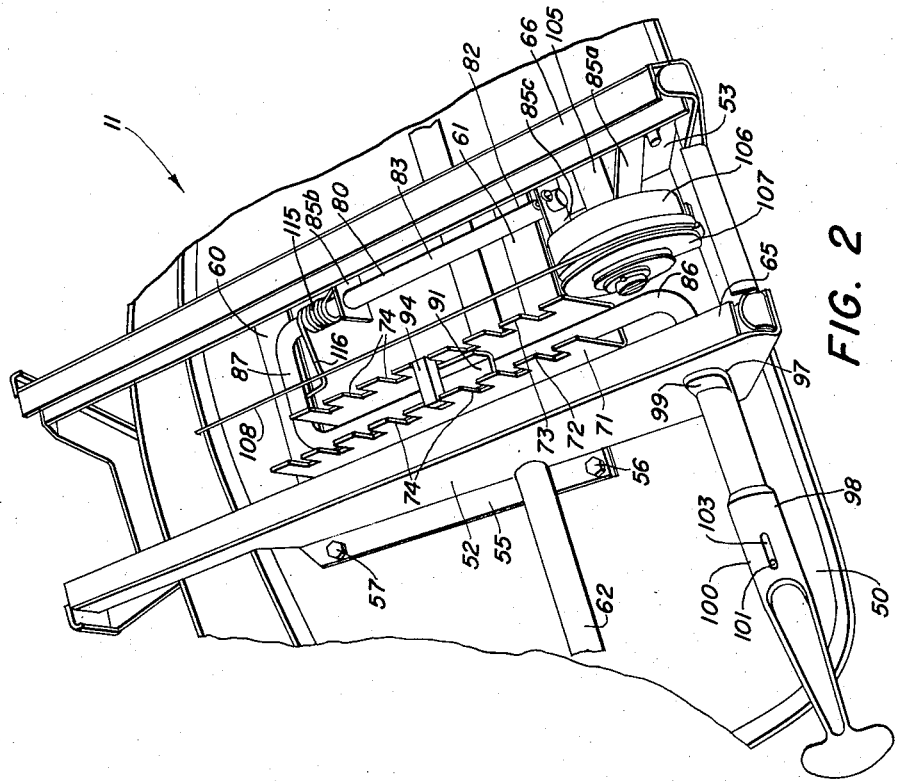
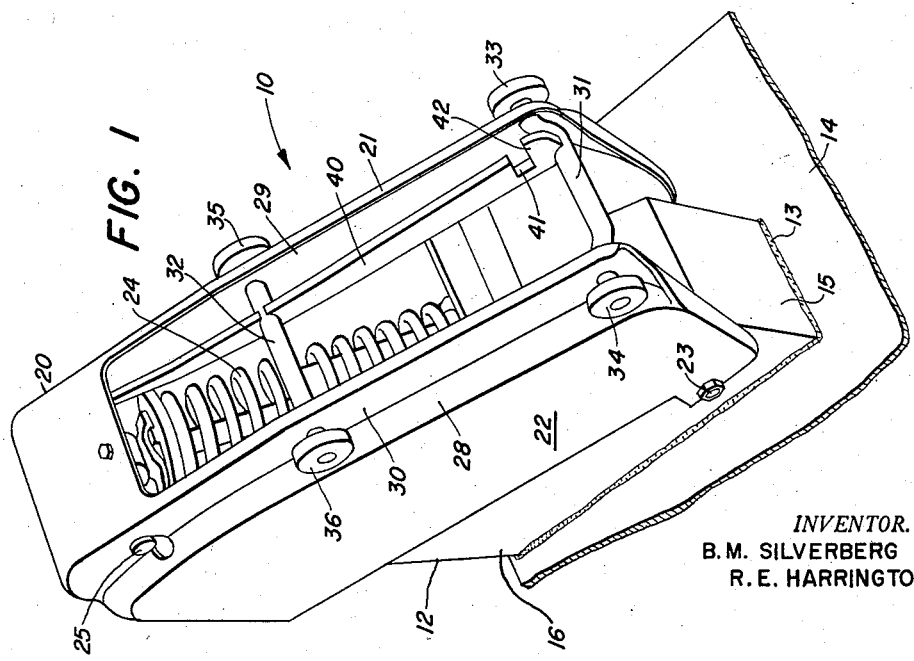
INVENTOR.
B. M. SILVERBERG &
R. E. HARRINGTON Sept. 2, 1958   B. M. SILVERBERG ET AL   2,850,074
SEAT ADJUSTING MECHANISM Filed July 25, 1955

INVENTOR.
B. M. SILVERBERG &
R. E. HARRINGTON

United States Patent Office 2,850,074
Patented Sept. 2, 1958

2,850,074

SEAT ADJUSTING MECHANISM

Bernard M. Silverberg, Rock Island, and Roy E. Harrington, Moline, Ill., assignors to Deere & Company, Moline, Ill., a corporation of Illinois Application July 25, 1955, Serial No. 524,104

15 Claims. (Cl. 155—14)

This invention relates to a seat structure of the type having an upright seat support fixed to the floor of a vehicle, or of a stationary object, and which has seat engageable members operative to engage structural portions mounted on a complementary seat for permitting fore-and-aft relative movement between the seat and the seat support. More particularly this invention relates to a position adjusting mechanism for regulating the position of the seat relative to the support.

A tractor or other type of self-propelled vehicle is normally operated from a seated position. However, in many instances, usually for short intervals of time, it is desirable to operate the vehicle from a standing position. Normally, however, the control mechanisms on the tractor, or other type of vehicle, are so positioned relative to the seat that rising from a seated to a standing position will cause the standing position to be uncomfortable unless, of course, the seat is first moved rearwardly or in some other manner from out of the working area of the operator.

In many types of seat structure fore-and-aft adjustment of the seat relative to the support is provided by a mechanism within the seat which unlocks the seat for movement relative to the seat support in order that the seat may be manually moved forwardly or rearwardly depending upon the desires of the operator. In many instances however it is not practical or safe when traveling or operating the vehicle at a relatively high rate of speed to adjust the seat. This is particularly so when the standing position will be maintained for a short interval such as will occur when it is desired to momentarily obtain a better view of a part of the vehicle or a part of the crop which is not normally visible from a seated position.

It is, therefore, desirable and it is the main purpose of this invention to provide an adjusting means on a seat of the type above described in which a simple movement of an operating lever releases the seat to move from the position it is normally in when the operator is seated rearwardly to a position permitting free movement of the operator when he is in a standing position, and which will, when the operator's weight is applied to the seat, permit the seat to automatically move to the original position it was in when the operator was seated.

It is also a purpose of this invention to provide in the above adjusting means adjustment of the seat relative to the support whereby the operator may regulate the position of the seat to his own individual comfort.

It is also an object of this invention to provide a simple lock on the above adjusting means which will permit the seat to move rearwardly when the operator rises to a standing position, but will not disturb the prior adjustment of the normal operating position of the seat unless deliberately effected by the operator.

Other objects and advantages of the invention will become apparent to those skilled in the art as the nature of the invention is better understood from the following detailed description thereof as illustrated in the accompanying drawings.

Fig. 1 is a front right perspective of the seat support looking down into the supporting structure.

Fig. 2 is a front perspective of the seat in a turned-over position and looking into the structure on the bottom of the seat used for mounting the seat on the seat support.

Figure 3:
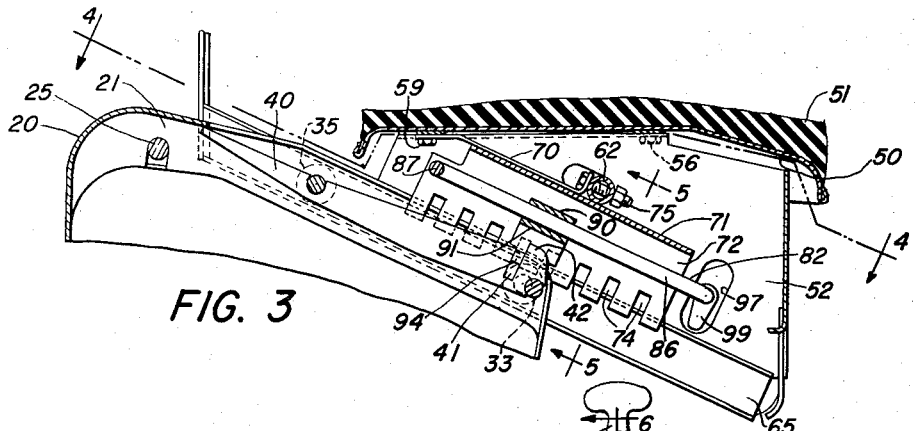
Fig. 3 is a sectional side view of a portion of the seat and a portion of the seat support taken along line 3—3 of Fig. 4 and showing the means of mounting the seat on the support.
Figure 4:
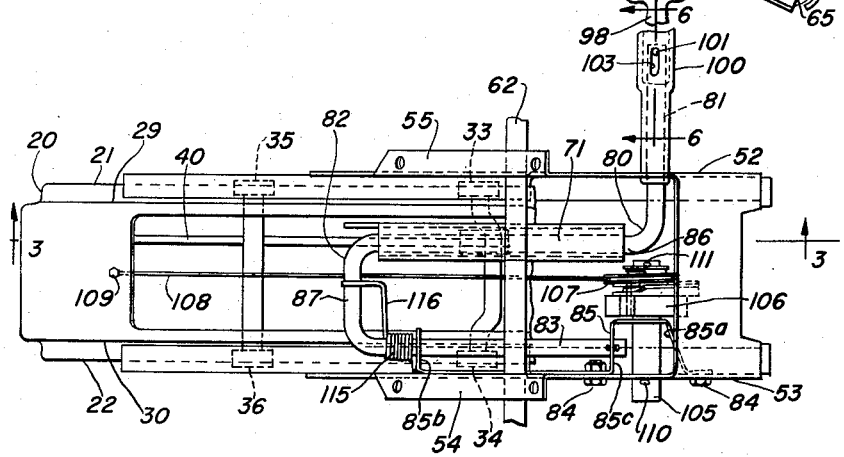
Fig. 4 is a sectional view taken along the line 4—4 of Fig. 3.
Figure 5:
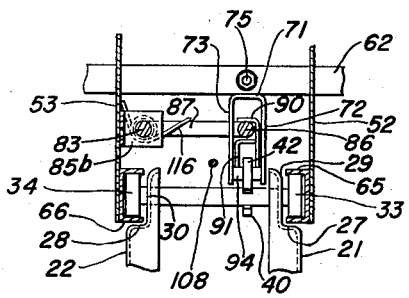
Fig. 5 is a sectional view taken along the line 5—5 of Fig. 3.
Figure 6:
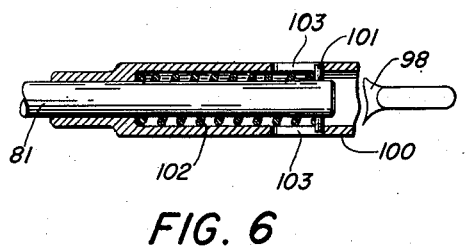
Fig. 6 is a sectional view on the line 6—6 of Fig. 4.

The seat structure is basically made up of a seat support, indicated in its entirety by the reference numeral 10 and shown in Fig. 1, and a seat cushion structure indicated in its entirety by the reference numeral 11 and shown in Fig. 2. The seat support comprises a supporting structure 12 fixed by welding, as at 13, or by other suitable means to the floor panel 14 of an operator's station on a tractor or other type of vehicle. The supporting structure 12 is elongated in its fore-and-aft direction and has a forward end 15 and a rearward end 16. Complementary to the lower supporting structure 12 is an upper supporting structure 20 which is also elongated in its fore-and-aft direction and which has depending side portions the forward portions of which are adjacent to and laterally outward of the forward end 15 of the lower supporting structure 12. For purposes of this description front and rear and left and right will be considered as it would be determined by a person in a seated position. The left and right side panels 21 and 22 are mounted on a suitable suspension linkage (not shown), which is in turn supported on a forward portion 15 of the lower supporting structure 12 by means including a transverse pivot 23. A suitable spring and shock absorbing assembly 24 is anchored to the lower supporting structure and has its upper end pivotally mounted on a transverse shaft 25 at the upper rear end of the structure 20. The upper portions of the side panels 21 and 22 are stepped inwardly to provide laterally disposed surfaces 27 and 28 and vertically disposed sections 29 and 30. A pair of fore-and-aft spaced apart transverse shafts 31 and 32 pass between and extend through the vertical sections 29 and 30. Mounted on opposite ends of the shafts 31 and 32 are rollers 33, 34, 35, 36, the rollers 33 and 35 being positioned outwardly of the vertical section 29 and the rollers 34 and 36 being positioned outwardly of the vertical section 30. A fore-and-aft extending elongated rigid member or part 40 is fixed to the shafts 31 and 32 and extends substantially the length of the upper supporting structure 20. The forward end of the member 40 is provided with a notch 41 and lug 42, the purpose of which will later become apparent.

The seat cushion structure 11, hereafter referred to as the seat, is composed basically of a metallic seat support or seat pan 50 which carries a conventional type seat cushion 51. Depending from the metallic seat support 50 is a pair of parallel and fore-and-aft extending structural members 52 and 53. The members 52 and 53 are flanged at their upper edges, as at 54 and 55, and are fixed to the metallic seat support 50 by means of bolt members 56 and 57 on the left structural member 52 and by similar bolt means, not shown, on the right structural member 53. Additional structural strength is provided on the bottom of the seat pan for receiving the bolts by means of front and rear transverse bar members 60, 61 which are welded to the pan 50. A tubular member 62 projects through the structural members 52, 53 and serves as the main support for the arm rests on the seat, the latter being not shown. Fixed to the lower arm portions of the structural members 52 and 53 by welding or other suitable means is a pair of fore-and-aft extending channel members 65 and 66. Each of the channel members 65 and 66 have laterally disposed and vertically spaced apart leg portions extending inwardly, with the leg portions of the channel member 65 engaging the rollers 33 and 35 and the legs of the channel member 66 engaging the rollers 34 and 36. Thus the seat structure is provided with a seat support having seat engageable members in the form of the rollers 33—36 and a seat which is provided with structural portions thereon engageable with the rollers in a manner permitting, unless otherwise restricted, relative fore-and-aft movement between the seat and the seat support. As is apparent in Fig. 3, the channel members 65 and 66 are normally inclined relative to the horizontal at substantially the same angle as the laterally disposed surfaces 27 and 28 on the side panels 21 and 22 thereby permitting the seat cushion to remain substantially horizontal regardless of the fore-and-aft disposition of the seat relative to the support.

Extending from the bottom of the metallic seat support 50 is a bracket 70 which is fixed to the seat by the bolt 59. Fixed to the under surface of the bracket 70 is a U-shaped rigid elongated member or part 71 extending in a fore-and-aft direction with depending side portions 72 and 73 positioned substantially parallel and on opposite sides of the elongated member or part 40. Each of the side portions 72, 73 has fore-and-aft spaced apart notches 74 transversely alined with the notches of the other side portion. The lower end of the bracket 70 is turned upwardly and is fixed to the tubular member 62 by the bolt and nut combination 75.

An adjusting lever 80 comprising an outwardly projecting portion 81 and an inner U-shaped portion 82 disposed between the structural members 52, 53 is provided for the seat. The portion 82 has a fore-and-aft extending leg 83 rockably mounted on inwardly extending portions 85b, 85c of a bracket 85 which is fixed to the right structural member 53 by bolts 84, and a second fore-and-aft extending leg 86 transversely spaced from the leg 83 and rigidly connected thereto by an integral cross piece 87. The forward end of the leg 86 is turned to form the outwardly projecting portion 81. Mounted for fore-and-aft sliding on the leg 86 is a pair of rigidly interconnected L-shaped brackets 90, 91, one bracket having a laterally disposed section positioned adjacent to and above the leg 86 and the other one having a laterally disposed section positioned adjacent to and below the leg 86 and both having depending sections with lower edges fixed to a transverse lock member or lug 94 which is positionable in the notches 74 and 41, in a manner presently to be described, and which serves as a lock member preventing relative movement between the seat 11 and seat support 10.

With reference to Fig. 3, details of the relative positions and sizes of the notches 41 and 74 will now be provided. The notches 41 and 74 are of substantially the same size with the notches 74 being offset vertically from the notch 41. The lug 94 may be moved in an up and down direction in the notches 74, 41. The bottom of the notch 41 extends below the lower edges of the depending side portions 72, 73 of the U-shaped member 71 sufficient to permit the lug 94 to be disengaged from the U-shaped member 71 while remaining in the notch 41. In this position the seat 11 may be moved relative to the seat support 10 to permit the lug 94 to be reinserted in any of the notches 74. Likewise, the notches 74 extend a sufficient amount above the upper surface of the elongated member 40 to permit the lug 94 to be disengaged from the member 40 while remaining in the associated notch 74. Obviously, when the lug 94 is in either of these latter two positions it will not affect or restrict relative movement between the seat 11 and the seat support 10. However, in an intermediate position as shown in Fig. 3, in which the lug 94 is in the lower portion of a notch 74 and in the upper portion of the notch 41 relative movement between the seat 11 and the seat support 10 is prevented and the seat is held in a fixed position.

The outer portion 81 of the adjusting lever 80 extends through an opening or aperture 97 in the structural member 52. The opening 97 is elongated in its vertical dimension to provide up and down movement of the lever 80. In response to up and down movement of the lever 80 a corresponding up and down movement of the lug 94 will occur. Thus the lug 94, in response to adjustment of the lever 80, may be moved to the upper portion of one of the notches 74 or to the lower portion of the slot 41, and thereby may be positioned to permit relative movement between the seat 11 and the support 10, or may be moved to a position locking the seat 11 against relative movement to the seat support.

Mounted in telescoping relationship with the outer portion 81 of the lever 80 is a lever extension 98. On the inner end of the extension 98 is a depending lug 99 which is operative to be positioned in the aperture 97 and when so positioned prevents downward movement of the lever 80. A mid-portion 100 of the lever extension 98 is enlarged to permit a spring 102 to be mounted on the outer end of the portion 81 of the lever. A pin 101 extends through the outer portion 81 of the lever and has opposite ends extending in slots 103 provided in the extension 98. The pin 107 and spring 102 resist axial movement of the extension 98 outwardly. Therefore, the lever 80 may be moved freely upwardly, but if desired to be moved in a downward direction the lever extension 98 must first be drawn axially outwardly against the pressure of the spring 102 to a position where the lug 99 is free of the edges of the aperture 97.

Extending through and angularly adjustably fixed to the supporting structural member 53 is a short transverse shaft 105. A fore-and-aft extension 85a of the bracket 85, suitably apertured to receive the shaft 105, is spaced from the member 53 and aids in the support of the shaft. An adjustably loaded motor spring 106 is connected at one end to and wrapped around the shaft 105 and is connected at its other end to an adjacent constant tension pulley 107 journaled on the shaft and having a cable 108 threaded over it. The cable 108 extends rearwardly and is connected at its rear to the supporting structure 20 by a bolt 109. The spring and pulley assembly is held against axial movement relative to the shaft 105 by cotter pins 110 and 111.

Mounted on one of the legs 83 of the U-portion 82 of the lever 80 is a pre-loaded torsion spring 115 having an inwardly extending arm 116 positioned to engage the upper surface of the cross piece 86 for the purpose of biasing the lever 80 downwardly. Normally downward movement of the lever 80 is limited to a position in which the lug 99 engages the lower edges of the aperture 97.

The adjusting mechanism operates in the following manner. For adjusting the seat for individual comfort while operating the vehicle from a seated position, the lever extension 98 is drawn outwardly to permit the lever 80 to be moved downwardly, thereby causing the lug 94 to be moved to the bottom portion of the notch 41 to become completely disengaged from the U-shaped member 71. The seat 11 may then be moved rearwardly or forwardly to a position satisfactory to the operator's comfort at which position the lever 80 will be moved upwardly to engage the corresponding notch 74 in the U-shaped member 71 while remaining in part of the notch 41. The lateral extension 98 is then permitted to move axially inwardly to a position in which the lug 99 engages the edges of the aperture 97 thereby locking the seat against further adjustment.

When it is desired to have the seat 11 moved temporarily to a rearward position, the lever 80 is moved upwardly, thereby causing the lug 94 to be moved upwardly and out of engagement with the notch 41. In this position the lug 94 will be maintained within that one of the notches 74 originally selected for the operator's comfort while in the seated position; and, when the operator stands and thus removes his weight from the cushion 51, the torsionally loaded spring 106 will automatically cause the seat 11 to move rearwardly to its maximum rearward position. When the obstacle or other purpose for standing has passed, the operator sits upon the seat and his weight on the seat will cause the seat to move forwardly, the lug 94 still remaining engaged with the selected notch 74 so as to engage the stop or lug 42 on the elongated member or complementary lock part 40 at which time further forward movement of the seat is prevented. The spring 115 will then force the lever 80 and the lug 94 downwardly into a position in which the lug 94 is in engagement with its complementary lock parts, which are the elongated member 40 and the U-shaped member 71, thereby again locking the seat and seat support against relative movement. Thus, the seat 11 may be released to move rearwardly when the operator wishes to be in a standing position, but may upon the operator again being seated be automatically moved and locked in its original position.

As will be seen, a new position of adjustment of the seat can be achieved only by clearing the lug 94 from its current notch 74, and this can be effected only when that notch is in vertical register with the notch 41. Hence, the change can only be made with the seat in a forward position and cannot be made when the seat is in its full rear position or any rear position in which the lug 94, retained in a notch 74, is behind the notch 41, because at that time the upper edge of the member 40 blocks withdrawal of the lug 94 from its notch 74. This factor is important from the standpoint of preventing accidental upsetting of the adjustment while the seat is rearwardly as aforesaid and still further eliminates the possibility of the lug getting jammed between two adjacent notches 74.

While only one form of the invention has been shown it should be recognized that other forms of the invention and variations could exist without departing basically from the broad general principles herein disclosed. It should therefore be understood that while the preferred embodiment of the invention has been described with the view of clearly and concisely illustrating the invention it is desired not to so limit or narrow the invention beyond that which is claimed.

What is claimed is:

1. A position adjusting mechanism for a seat structure including a seat support element carrying a seat element for fore-and-aft movement relative to the support element, comprising: a pair of fore-and-aft extending parts, one part being fixed to one element and the other part being fixed to the other element; a lock member; means mounting the lock member on the one element for movement fore-and-aft relative thereto, said means being adjustable to cause the lock member to engage the pair of parts simultaneously for thereby preventing relative movement between said elements or to engage either of the parts individually for thereby permitting relative movement between said elements; means biasing the seat element rearwardly; and a one-way stop operative to engage the lock member when it is in engagement with said one part for limiting forward movement of the seat element.

2. A position adjusting mechanism for a seat structure including a seat support element carrying a seat element for fore-and-aft movement relative to the support element, comprising: a fore-and-aft extending part fixed to one element and having a plurality of fore-and-aft spaced apart lock engaging portions; a lock member; means mounting the lock member on said one element for movement fore-and-aft relative thereto and adjustable to selectively cause the lock member to engage the part at a selected lock engaging portion for preventing relative movement between said one element and the lock member; means biasing the seat element rearwardly; and a one-way stop on the other element operative to engage the lock member when it is in engagement with a selected lock engaging portion of said part for limiting forward movement of the seat element.

3. A position adjusting mechanism for a seat structure including a seat support element carrying a seat element for fore-and-aft movement relative to the support element, comprising: a pair of rigid parts, one part being fixed to the one element and the other part being fixed to the other element; a lock member; means mounting the lock member on said one element for movement fore-and-aft relative thereto and adjustable to cause the lock member to engage the parts simultaneously for preventing relative movement between said elements or to engage either of the parts individually for permitting relative movement between said element, said lock member being engageable with said one part at a plurality of fore-and-aft spaced apart portions; means biasing the seat element rearwardly and for moving the seat element when either of said parts are engaged individually; and a one-way stop on said other element operative to engage the lock member when it is in engagement with said one part for limiting forward movement of the seat element.

4. A position adjusting mechanism for a seat structure including a seat support element carrying a seat element for fore-and-aft movement relative to the support element, comprising: a fore-and-aft extending elongated part fixed to one element and having a plurality of fore-and-aft spaced apart lock engaging portions; a rigid part fixed to the other element; a lock member; means mounting the lock member on said one element for movement fore-and-aft relative thereto and adjustable to selectively cause the lock member to engage one of the lock engaging portions and the rigid part simultaneously for preventing relative movement between the elements or to engage either part individually for permitting relative movement between said elements; means biasing the seat element rearwardly; and one-way stop means operative to engage the lock member when it is in engagement with said elongated part for limiting forward movement of the seat element and for alining a lock engaging portion of the elongated part with the rigid part.

5. A position adjusting mechanism for a seat structure including a seat support element carrying a seat element for fore-and-aft movement relative to the support element, comprising: a fore-and-aft extending elongated part fixed to one element and having a plurality of fore-and-aft spaced apart lock engaging portions; a rigid part fixed to the other element; a lock member; means mounting the lock member on the one element for movement fore-and-aft relative thereto and adjustable to selectively cause the lock member to engage one of the lock engaging portions and the rigid part simultaneously for preventing relative movement between the elements or to engage either individually for permitting relative movement between said elements; and stop means operative to engage the lock member when it is in engagement with said elongated part for limiting forward movement of the seat element and for alining a lock engaging portion of the elongated part with the rigid part.

6. A position adjusting mechanism for a seat structure including a seat support element carrying a seat element for fore-and-aft movement relative to the support element, comprising: a pair of fore-and-aft extending elongated parts, one part being fixed to one element and the other connected to the other element; a lock member mounted on said one element for movement fore-and-aft relative thereto; an adjusting lever extending through an aperture in said one element and connected to the lock member, the lever being positionable to cause the lock member to engage the pair of elongated parts simultaneously for preventing relative movement between the two elements or to engage either of the pair individually for permitting relative movement between said elements; a one-way stop fixed to said one element forwardly of and operative to engage the lock member when it is in engagement with said one part for limiting forward movement of the seat element; and an enlarged extension section mounted on and adjustable along the lever to fill the space between the lever and the edges of the aperture for preventing movement of the lever.

7. The invention defined in claim 6, further characterized by biasing means between the extension section and lever for automatically moving the section into engagement with the edges of the aperture.

8. A position adjusting mechanism for a seat structure including a seat support element carrying a seat element for movement relative to the support element between a relatively low forward position and a high rearward position, comprising: a pair of rigid parts, one part being fixed to one element and the other part being fixed to the other element; a lock member; means mounting the lock member on said one element for movement fore-and-aft relative thereto and adjustable to cause the lock member to engage the parts simultaneously for preventing relative movement between the elements or to engage either of the pair individually for permitting relative movement between said elements, said lock member being engageable with said one part at a plurality of fore-and-aft spaced apart portions; means biasing the seat element toward its high rearward position when either of said parts is engaged individually; and a one-way stop on said other element operative to engage the lock member when it is in engagement with said one part for limiting movement of the seat element to its low forward position upon weight being applied to the seat element.

9. A seat structure, comprising: a seat support element; a seat element; means mounting the seat element on the support element for relative fore-and-aft movement between an extreme relatively low forward position and an extreme, relatively high rear position; means biasing the seat element to move to and remain at said rear position when unoccupied and yielding to enable the seat element to move toward said front position when occupied; lock mechanism for releasably locking the seat in any selected one of a plurality of positions spaced apart fore-and-aft in a range ahead of the rear position and behind the forward position, said mechanism including a stop on one element and a lock member and a lock part on the other element, said lock member having a plurality of spaced apart lock portions corresponding to said positions in said range and said lock part being selectively settable relative to said lock member for cooperation with any selected one of said lock portions and engageable in any selected setting with the stop; and means for releasing the lock part from the stop while retaining the setting of said lock part relative to said member to enable biased uphill movement of the unoccupied seat element and return of the occupied seat element to said selected position with said part re-engaging said stop.

10. A seat structure, comprising: a seat support element; a seat element; means mounting the seat element on the support element for relative movement forwardly from and rearwardly back to an extreme rear position; lock mechanism for releasably locking the seat in any selected one of a plurality of positions spaced apart fore-and-aft in a range ahead of the rear position, said mechanism including a stop on one element and a lock member and a lock part on the other element, said lock member having a plurality of spaced apart lock portions corresponding to said positions in said range and said lock part being selectively settable relative to said lock member for cooperation with any selected one of said lock portions and engageable in any selected setting with the stop; and means for releasing the lock part from the stop while retaining the setting of said lock part relative to said member to enable rearward movement of the seat element to said rear position and for return of the seat element to said selected position with said part re-engaging said stop.

11. The invention defined in claim 10, including: means blocking changes in the setting of the lock part relative to the lock member while the seat element is in a position rearwardly of the positions in said range.

12. A seat structure, comprising: a seat support; a seat; means mounting the seat on and for movement relative to the support forwardly and downwardly from and upwardly and rearwardly back to an extreme, relatively high rear position; means biasing the seat toward and to remain at said rear position when unoccupied and yielding to occupancy of the seat to enable the seat to move forwardly; lock mechanism cooperative between the seat and support and effective to intercept forward movement of the seat at any selected one of a plurality of fore-and-aft spaced apart forward positions in a locking range including an extreme forward position and an intermediate position spaced ahead of said extreme rear position, said lock mechanism including cooperative lock parts operative upon interception of the seat in said range to interengage so as to retain the seat against biased rearward movement; and means for releasing the lock parts to enable the biasing means to move the unoccupied seat rearwardly out of said locking range and to said extreme rear position.

13. A seat structure, comprising: a seat support; a seat; means mounting the seat on said support for movement of the seat fore-and-aft relative to said support, including a first fore-and-aft member on the seat having a lower edge provided with a plurality of fore-and-aft spaced apart downwardly opening notches, said mounting means further including a second member on the seat support and parallel to the first member and having an upper edge provided with an upwardly opening notch, said members being in side-by-side partially overlapping relation and the notches being of such depth that the upper edge of said second member is higher than the lower edge of the first member so as to traverse the first member notches, any selected one of said first member notches being vertically alinable with the second member notch according to the fore-and-aft position of the seat and first member relative to the seat support and second member; a lug receivable in a pair of vertically alined notches and having such vertical dimension as to be selectively movable upwardly into the first member notch to an up position clear of the second member notch so that the members are relatively movable fore-and-aft, downwardly into the second member notch to a down position clear of the first member notches so that the members are again relatively movable fore-and-aft and into an intermediate position lying in part in both alined notches so as to lock the members against relative movement; a stop; means fixing the stop to the seat support to engage ahead of the lug in its up position so as to limit forward movement of the seat relative to the support; means biasing the seat rearwardly relative to the support; a lever connected to and for moving the lug among its aforesaid positions; means mounting the lever movably on the seat for movement between two extreme positions corresponding respectively to the up and down positions of the lug; means on the seat providing an aperture through which the lever extends for movement between said extreme positions; and a part shiftable on the lever and engageable at times with one edge of the aperture to prevent movement of the lever to the extreme position that corresponds to the down position of the lug.

14. A seat structure, comprising: a seat support; a seat; means mounting the seat on said suport for movement of the seat fore-and-aft relative to said support, including a first fore-and-aft member on the seat having a lower edge provided with a plurality of fore-and-aft spaced apart downwardly opening notches, said mounting means further including a second member on the seat support and parallel to the first member and having an upper edge provided with an upwardly opening notch, said members being in side-by-side partially overlapping relation and the notches being of such depth that the upper edge of said second member is higher than the lower edge of the first member so as to traverse the first member notches, any selected one of said first member notches being vertically alinable with the second member notch according to the fore-and-aft position of the seat and first member relative to the seat support and second member; a lug receivable in a pair of vertically alined notches and having such vertical dimension as to be selectively movable upwardly into the first member notch to an up position clear of the second member notches so that the members are relatively movable fore-and-aft, downwardly into the second member notch to a down position clear of the first member notches so that the members are again relatively movable fore-and-aft and into an intermediate position lying in part in both alined notches so as to lock the members against relative movement; a stop; means fixing the stop to the seat support to engage ahead of the lug in its up position so as to limit forward movement of the seat relative to the support; means biasing the seat rearwardly relative to the support; a lever connected to and for moving the lug among its aforesaid positions; and means mounting the lever movably on the seat for movement between two extreme positions corresponding respectively to the up and down positions of the lug.

15. A seat structure, comprising: a seat support; a seat; means mounting the seat on said support for movement of the seat fore-and-aft relative to said support, including a first fore-and-aft member on the seat having a lower edge provided with a plurality of fore-and-aft spaced apart downwardly opening notches, said mounting means further including a second member on the seat support and parallel to the first member and having an upper edge provided with an upwardly opening notch, said members being in side-by-side partially overlapping relation and the notches being of such depth that the upper edge of said second member is higher than the lower edge of the first member so as to traverse the first member notches, any selected one of said first member notches being vertically alinable with the second member notch according to the fore-and-aft position of the seat and first member relative to the seat support and second member; a lug receivable in a pair of vertically alined notches and having such vertical dimension as to be selectively movable upwardly into the first member notch to an up position clear of the second member notch so that the members are relatively movable fore-and-aft, downwardly into the second member notch to a down position clear of the first member notches so that the members are again relatively movable fore-and-aft and into an intermediate position lying in part in both alined notches so as to lock the members against relative movement; a stop; means fixing the stop to the seat support to engage ahead of the lug in its up position so as to limit forward movement of the seat relative to the support; means biasing the seat rearwardly relative to the support; and means connected to and for moving the lug among its aforesaid positions.

References Cited in the file of this patent

UNITED STATES PATENTS

| | | |
|---|---|---|
| 2,076,309 | Whedon | Apr. 16, 1937 |
| 2,161,367 | McGregor et al. | June 6, 1939 |
| 2,170,923 | Jacobs | Aug. 29, 1939 |
| 2,715,433 | Dolgorukov | Aug. 16, 1955 |

FOREIGN PATENTS

| | | |
|---|---|---|
| 436,701 | Great Britain | Oct. 16, 1935 |